United States Patent
Berris, Jr.

(10) Patent No.: US 9,285,206 B1
(45) Date of Patent: Mar. 15, 2016

(54) MEASUREMENT DEVICE FOR PILE DISPLACEMENT AND METHOD FOR USE OF THE SAME

(71) Applicant: PILE DYNAMICS, INC., Solon, OH (US)

(72) Inventor: Richard E. Berris, Jr., Chagrin Falls, OH (US)

(73) Assignee: Pile Dynamics, Inc., Solon, OH (US)

( * ) Notice: Subject to any disclaimer, the term of this patent is extended or adjusted under 35 U.S.C. 154(b) by 313 days.

(21) Appl. No.: 13/760,549

(22) Filed: Feb. 6, 2013

Related U.S. Application Data

(60) Provisional application No. 61/595,765, filed on Feb. 7, 2012.

(51) Int. Cl.
*G01B 7/14* (2006.01)

(52) U.S. Cl.
CPC .................................. *G01B 7/14* (2013.01)

(58) Field of Classification Search
CPC .......... G01B 7/14; G01B 7/102; G01B 7/107; G01B 7/148; G01B 7/10; E21B 47/02208; G01S 11/02; G01S 11/04
USPC .......................................... 324/637; 342/458
See application file for complete search history.

(56) References Cited

U.S. PATENT DOCUMENTS

| | | | |
|---|---|---|---|
| 2,056,390 A | 10/1936 | Case | |
| 2,204,438 A | 6/1940 | Neufeld | |
| 2,248,343 A | 7/1941 | Elliott | |
| 2,279,466 A | 4/1942 | Johnske et al. | |
| 2,295,383 A | 9/1942 | Carlson | |
| 2,368,921 A | 2/1945 | Greene et al. | |
| 2,405,238 A | 8/1946 | Seeley | |
| 2,465,381 A | 3/1949 | Libby | |
| 2,472,129 A | 6/1949 | Streeter, Jr. | |
| 2,475,975 A | 7/1949 | McCarthy et al. | |
| 2,513,485 A | 7/1950 | Herrick | |
| 2,530,902 A | 11/1950 | O'Brien | |

(Continued)

OTHER PUBLICATIONS

Bradshaw, Design and Construction of Driven Pile Foundations—Lessons Learned on the Central Artery/Tunnel Project, Office of Infrastructure Research and Development, Jun. 2006, pp. 5-6, 9-10, 13, 17-18.*

(Continued)

*Primary Examiner* — Melissa Koval
*Assistant Examiner* — Rahul Maini
(74) *Attorney, Agent, or Firm* — Rankin, Hill & Clark LLP

(57) ABSTRACT

A displacement measuring system to measure the displacement of a structural object that includes a transmitter having a signal generator and an antenna wherein the antenna is securable relative to one of a displaced object and a support. The antenna defines a transmitter axis that is parallel to the displacement axis of the object and a centerline that is perpendicular to the displacement axis. The system further includes a first receiver and a second receiver having antennas securable relative to the other of the object and the support. The receiver antennas are positioned along a receiver axis that is parallel to the displacement axis and being spaced along the receiver axis on either side of the center line. The receiver antennas are configured to detect a signal emitted by the transmitter. The system further includes a phase detector to triangulate phase change and calculate object displacement.

25 Claims, 6 Drawing Sheets

(56) References Cited

U.S. PATENT DOCUMENTS

| | | | |
|---|---|---|---|
| 2,581,438 | A | 1/1952 | Palmer |
| 2,975,418 | A | 3/1961 | Himmel |
| 3,005,200 | A | 10/1961 | O'Meara |
| 3,076,192 | A | 1/1963 | Brown et al. |
| 3,113,315 | A | 12/1963 | Preikschat |
| 3,237,196 | A | 2/1966 | Hampton |
| 3,311,738 | A | 3/1967 | Makow |
| 3,329,955 | A | 7/1967 | Beukers et al. |
| 3,594,801 | A | 7/1971 | Smith |
| 3,604,946 | A | 9/1971 | Prozeller |
| 3,671,968 | A | 6/1972 | Beukers et al. |
| 3,701,155 | A | 10/1972 | Adams |
| 3,735,150 | A | 5/1973 | Harris |
| 3,745,575 | A * | 7/1973 | Kikuchi .................. 342/22 |
| 3,774,216 | A | 11/1973 | Coleman et al. |
| 3,851,155 | A | 11/1974 | Hewgley, Jr. et al. |
| 3,886,555 | A | 5/1975 | Royal |
| 3,939,477 | A | 2/1976 | Green et al. |
| 3,947,803 | A | 3/1976 | Brown |
| 3,973,262 | A | 8/1976 | Bohm |
| 4,003,060 | A | 1/1977 | Broce et al. |
| 4,006,423 | A | 2/1977 | Kuniyoshi et al. |
| 4,025,924 | A | 5/1977 | Luedtke et al. |
| 4,034,376 | A | 7/1977 | Barton |
| 4,057,803 | A | 11/1977 | Coleman |
| 4,097,869 | A | 6/1978 | Robinson |
| 4,148,034 | A | 4/1979 | Cooney |
| 4,158,843 | A | 6/1979 | Kuchy |
| 4,219,821 | A | 8/1980 | Selim |
| 4,246,581 | A | 1/1981 | DiToro |
| 4,410,890 | A | 10/1983 | Davis et al. |
| 4,446,388 | A | 5/1984 | O'Hara |
| 4,486,757 | A | 12/1984 | Chose et al. |
| 4,609,888 | A | 9/1986 | Corzine et al. |
| 4,628,461 | A | 12/1986 | Adams |
| 4,636,720 | A | 1/1987 | Farr |
| 4,724,442 | A | 2/1988 | King |
| 4,780,722 | A | 10/1988 | Cusdin |
| 4,868,512 | A | 9/1989 | Bridgman |
| 4,975,650 | A | 12/1990 | Martin |
| 4,978,963 | A | 12/1990 | Thorpe |
| 4,983,983 | A | 1/1991 | Huntley et al. |
| 5,130,543 | A | 7/1992 | Bradbeer |
| 5,142,555 | A | 8/1992 | Whiteside |
| 5,196,804 | A | 3/1993 | Oetzmann |
| 5,266,851 | A | 11/1993 | Nukui |
| 5,448,248 | A | 9/1995 | Anttila |
| 5,512,911 | A | 4/1996 | Oprea |
| 5,521,548 | A | 5/1996 | Sugawara |
| 5,610,818 | A * | 3/1997 | Ackroyd et al. ........ 455/456.3 |
| 5,621,669 | A * | 4/1997 | Bjornsson ................. 702/85 |
| 5,894,674 | A | 4/1999 | Feldman |
| 5,900,747 | A | 5/1999 | Brauns |
| 5,978,749 | A | 11/1999 | Likins, Jr. et al. |
| 6,031,885 | A | 2/2000 | Ishimoto et al. |
| 6,175,283 | B1 | 1/2001 | Fehrenbach et al. |
| 6,271,791 | B1 | 8/2001 | Bruzzone |
| 6,281,841 | B1 | 8/2001 | Nevill |
| 6,288,682 | B1 | 9/2001 | Thiel et al. |
| 6,301,551 | B1 | 10/2001 | Piscalko et al. |
| 6,359,445 | B1 | 3/2002 | Pfizenmaier et al. |
| 6,488,105 | B1 * | 12/2002 | Wilcox .................... 175/298 |
| 6,533,502 | B2 * | 3/2003 | McVay et al. ........... 405/232 |
| 6,539,316 | B1 | 3/2003 | Doten et al. |
| 6,762,626 | B1 | 7/2004 | Dreps et al. |
| 6,836,154 | B2 | 12/2004 | Fredriksson |
| 6,933,889 | B1 | 8/2005 | Wolf et al. |
| 6,995,787 | B2 * | 2/2006 | Adams ..................... 348/157 |
| 7,046,042 | B1 | 5/2006 | Dino et al. |
| 7,148,802 | B2 | 12/2006 | Abbruscato |
| 7,251,573 | B2 | 7/2007 | Sanduleanu et al. |
| 7,266,352 | B2 * | 9/2007 | Soe et al. ................. 455/209 |
| 7,295,640 | B2 | 11/2007 | Minzoni et al. |
| 7,436,921 | B1 | 10/2008 | Mulbrook et al. |
| 7,451,684 | B2 * | 11/2008 | Muller et al. .................. 91/1 |
| 7,477,192 | B1 | 1/2009 | Haff et al. |
| 7,486,756 | B2 | 2/2009 | Tsai |
| 7,492,165 | B2 | 2/2009 | Maier et al. |
| 7,526,163 | B2 * | 4/2009 | Freeland et al. ........... 385/101 |
| 7,612,715 | B2 | 11/2009 | Macleod |
| 7,741,848 | B1 * | 6/2010 | Olsson et al. ............. 324/326 |
| 7,786,731 | B2 * | 8/2010 | Cole et al. ................ 324/326 |
| 7,791,378 | B1 | 9/2010 | Sutardja et al. |
| 7,813,900 | B2 * | 10/2010 | Takeda et al. ............. 702/197 |
| 7,844,298 | B2 | 11/2010 | Riley |
| 7,915,889 | B2 | 3/2011 | Shintani et al. |
| 7,952,357 | B2 * | 5/2011 | Cole ......................... 324/326 |
| 8,520,753 | B2 * | 8/2013 | Zheng ....................... 375/260 |
| 2005/0088301 | A1 | 4/2005 | Abbruscato |
| 2006/119514 | A1 | 6/2006 | Pritchard et al. |
| 2006/0158375 | A1 | 7/2006 | Macleod |
| 2007/0155350 | A1 * | 7/2007 | Razavi et al. ............. 455/147 |
| 2007/0286730 | A1 * | 12/2007 | Schmidt ................. 416/157 A |
| 2009/0243915 | A1 | 10/2009 | Nishizato et al. |
| 2010/0004880 | A1 * | 1/2010 | Royle et al. ................. 702/57 |

OTHER PUBLICATIONS

Dalton et al.; Non-provisional U.S. Appl. No. 13/159,719, filed Jun. 14, 2011.

* cited by examiner

01
MEASUREMENT DEVICE FOR PILE DISPLACEMENT AND METHOD FOR USE OF THE SAME

This application claims priority in Provisional Patent Application Ser. No. 61/595,765 filed on Feb. 7, 2012, which is incorporated by reference herein.

The invention of this application relates to devices used to measure the vertical displacement of a driven pile during installation. More particularly, to a highly accurate measurement device for vertical displacement measurement that has been found to work particularly well for use with the "end of drive" measurement portion of the pile driving process.

However, while it has been found to work particular well for this end of drive measurements, the invention of this applicant could be use for detecting all pile displacement.

INCORPORATION BY REFERENCE

The following patents and publications are incorporate by reference into the disclosure and specification of this application as background material:

The Johnske U.S. Pat. No. 2,279,466 discloses a radio direction finder; Greene U.S. Pat. No. 2,368,921 discloses a dual automatic radio direction finding system; U.S. Pat. No. 2,465,381 discloses a loop antenna system; McCarthy U.S. Pat. No. 2,475,975 discloses an apparatus for direction finding; Herrick U.S. Pat. No. 2,513,485 discloses a multi-band radio receiver; Himmel U.S. Pat. No. 2,975,418 discloses a direction finding system; Omeara U.S. Pat. No. 3,005,200 discloses a three element, Vector phase radio direction finder; Smith U.S. Pat. No. 3,594,801 discloses a direction finder; Beukers U.S. Pat. No. 3,671,968 discloses a two-channel direction finder; Adams U.S. Pat. No. 3,701,155 discloses an automatic direction finder; Coleman U.S. Pat. No. 3,774,216 discloses a direction finder; Royal U.S. Pat. No. 3,886,555 discloses a radiating target direction finding system; Green U.S. Pat. No. 3,939,477 discloses a four poled direction finder and antenna therefore; Brown U.S. Pat. No. 3,947,803 discloses a direction finding system; Bohm U.S. Pat. No. 3,973,262 discloses a radio direction finder; Broce U.S. Pat. No. 4,003,060 discloses a direction finding receiver; Luedtke U.S. Pat. No. 4,025,924 discloses a mobile direction comparator; Barton U.S. Pat. No. 4,034,376 discloses a radio direction finder with array element signal processing; Coleman U.S. Pat. No. 4,057,803 discloses an adaptive direction of arrival antenna system; Robinson U.S. Pat. No. 4,097,869 discloses a direction finder antenna; Cooney U.S. Pat. No. 4,148,034 discloses a radio direction finding system; Kuchy U.S. Pat. No. 4,158,843 discloses an automatic direction finder antenna preamplifier processor; Selim U.S. Pat. No. 4,219,821 discloses an automatic direction finding system; Ditoro U.S. Pat. No. 4,246,581 discloses a direction finder; Davis U.S. Pat. No. 4,410,890 discloses a directional receiver; Ghose U.S. Pat. No. 4,486,757 discloses an automatic direction finder; Corzine U.S. Pat. No. 4,609,888 discloses a direction finding antenna interface; King U.S. Pat. No. 4,724,442 discloses a method and apparatus for loop direction finding; Cusdin U.S. Pat. No. 4,780,722 discloses a radio direction finding apparatus; Thorpe U.S. Pat. No. 4,978,963 discloses an RF signal direction finding apparatus; Huntley U.S. Pat. No. 4,983,983 discloses a semi-automatic direction finding set; Bradbeer U.S. Pat. No. 5,130,543 discloses a direction sensitive energy detecting apparatus; Anttila U.S. Pat. No. 5,448,248 discloses an adaptive radio direction finding system; Feldman U.S. Pat. No. 5,894,674 discloses a method and apparatus for determining direction; Bruzzone U.S. Pat. No. 6,271,791 discloses a radio signal direction finding apparatus; Nevill U.S. Pat. No. 6,281,841 discloses a direction determining apparatus; Thiel U.S. Pat. No. 6,288,682 discloses a directional antenna assembly; Wolf U.S. Pat. No. 6,933,889 discloses a direction and distance finder; Abbruscato U.S. Pat. No. 7,148,802 discloses a direction finder and locater; Haff U.S. Pat. No. 7,477,192 discloses a direction finding system and method; Macleod U.S. Pat. No. 7,612,715 discloses direction finding; Riley U.S. Pat. No. 7,844,298 discloses a tuned directional antenna; Abbruscato Publication No. US 2005/0088301 discloses a directional finder and locater; Pritchard Publication No. US 2006/0119514 discloses a radio signal direction finder; Macleod Publication No. US 2006/0158375 discloses direction finding; Hewgley Jr. U.S. Pat. No. 3,851,155 discloses a phase displacement detection system; Oprea U.S. Pat. No. 5,512,911 discloses a microwave integrated tuned detector; Ishimoto U.S. Pat. No. 6,031,885 discloses a displacement detecting apparatus; Takeda U.S. Pat. No. 7,813,900 discloses a displacement detection method and device; Shintani U.S. Pat. No. 7,915,889 discloses a linear displacement detection apparatus; Preikschat U.S. Pat. No. 3,113,315 discloses a phase comparator microwave energy direction finder; Prozeller U.S. Pat. No. 3,604,946 discloses a phase detector; Harris U.S. Pat. No. 3,735,150 discloses a low noise phase detector; Kuniyoshi U.S. Pat. No. 4,006,423 discloses a phased detector; O'Hara U.S. Pat. No. 4,446,388 discloses a microwave phase discriminator; Adams U.S. Pat. No. 4,628,461 discloses a phase detector; Fan U.S. Pat. No. 4,636,720 discloses a phase detector; Bridgman U.S. Pat. No. 4,868,512 discloses a phase detector; Martin U.S. Pat. No. 4,975,650 discloses a phase detector; Whiteside U.S. Pat. No. 5,142,555 discloses a phase detector; Oetzmann U.S. Pat. No. 5,196,804 discloses a phase detector; Nukui U.S. Pat. No. 5,266,851 discloses a phase detector; Sugawara U.S. Pat. No. 5,521,548 discloses a phase detector; Brauns U.S. Pat. No. 5,900,747 discloses a sampling phase detector; Doten U.S. Pat. No. 6,539,316 discloses a phase detector; Dreps U.S. Pat. No. 6,762,626 discloses a phase detector; Frederiksson U.S. Pat. No. 6,836,154 discloses phase detectors; Dino U.S. Pat. No. 7,046,042 discloses a phase detector; Sanduleanu U.S. Pat. No. 7,251,573 discloses a phase detector; Minzoni U.S. Pat. No. 7,295,640 discloses a phase detector; Mulbrook U.S. Pat. No. 7,436,921 discloses a phase detector; Tsai U.S. Pat. No. 7,486,756 discloses a phase detector; Sutardja U.S. Pat. No. 7,791,378 discloses a phase detector; Case U.S. Pat. No. 2,056,390 discloses a tuned coupling system; Neufeld U.S. Pat. No. 2,204,438 discloses a position determining system and method; Elliott U.S. Pat. No. 2,248,343 discloses a carrier wave system; Carlson U.S. Pat. No. 2,295,383 discloses a two band signal receiving system; Seeley U.S. Pat. No. 2,405,238 discloses a position determining system; Streeter Jr. U.S. Pat. No. 2,472,129 discloses a radio navigation system; O'Brien U.S. Pat. No. 2,530,902 discloses a receiving apparatus for radio frequency navigation system; Palmer U.S. Pat. No. 2,581,438 discloses a navigation computer and piloting system; Brown U.S. Pat. No. 3,076,192 discloses an automatic radio navigation system; Hampton U.S. Pat. No. 3,237,196 discloses a radio navigational aid; Makow U.S. Pat. No. 3,311,738 discloses an analog spherical triangle computer; Beukers U.S. Pat. No. 3,329,955 discloses a doppler direction finder; Fehrenbach U.S. Pat. No. 6,175,283 discloses a microwave pulse generator; Pfizenmaier U.S. Pat. No. 6,359,445 discloses a microwave sensor for determining position for displacement of a movable part; Muller U.S. Pat. No. 7,451,684 discloses an actuator device with a microwave position detecting device; Maier U.S. Pat. No. 7,492,165 discloses a position detecting device with a microwave antenna arrangement; and Nishizato Publication No. US 2009/0243915 discloses a microwave sensor apparatus and microwave sensor system.

Again, all of these patents and publications listed above are incorporated by reference herein into this application and form part of this specification.

Also incorporated by reference is pending non-provisional patent application Ser. No. 13/159,719 which is owned by the assignee of this application and which discloses a measurement device and system for determining pile displacement. This prior pending application also forms part of the specification of this application.

BACKGROUND OF THE INVENTION

There are many methods for measuring the vertical displacement of a pile during the installation of the pile. These include those which are attached to the installation equipment and those which are separate from the equipment. Many of these systems have been found to be very effective in the field, but some fail to have the accuracy needed for the "end of drive" portion of the driving process. In that this portion of the drive can determine if the desired depth has been reached, the end of drive measurements need to be accurate, but still cost effective.

More particularly, the desired pile depth is generally known in that the depth of the underlying bedrock is generally known in most areas. Therefore, installers generally know how deep a pile needs to be driven. But, the exact depth or "set point" to achieve a desired bearing parameter is not exactly known. Therefore, exact displacement measurements are more critical to determine when the desired depth (or set point) is reached during the end of drive.

One such method of determining general pile depth involves the use of lines or markings on the side of the pile which can be used to generally determine how deep the pile has been driven. While this is a low cost and effective way to determine the general depth of the pile, the general depth does not determine whether or not the pile has engaged the underlying bedrock and thus the pile has reached its desired set point. Therefore, this method is typically used for estimation of capacity of the pile. As a result, this marking system is typically used with one or more other methods to determine if the set point has been reached.

In order to determine if the set point has been reached, the incremental displacement of the pile can be monitored for each hit by the pile driving hammer. While incremental displacement can be effective to determine the set point, it is difficult to accurately measure for several reasons including, but not limited to, the violent nature of a pile driving hammer blow. For example, this is difficult to measure based on a marker positioned on the ground since the ground moves when the pile is struck by the hammer.

In the United States, incremental displacement measurements can be the number of hammer blows per inch wherein if there are 30-50 blows needed to displace a pile 1 inch, the pile has reached the set point. In other regions, it can be the distance per blow such as how many tenths of a millimeter per blow.

Another system that has been used in the art to monitor and/or record the installation process of a pile is disclosed in Likens U.S. Pat. No. 5,978,749. Likens discloses a pile installation recording system and is incorporated by reference herein and forms part of the specification of this application. More particularly, the Likins Patent discloses a pile installation recording system for both driven piles and auger-cast piles. The disclosed system can record a variety of parameters or data received from one or more sensing devices that are either attached to the pile, attached to the rig, or in a measurement range from the rig and/or the pile. These sensing devices can be any sensing devices known in the art and can be used to determine a wide range of parameters including, but not limited to, sensing the depth of a driven pile.

However, while Likins has been found to be a very effective system in the field, applicant has found that the depth measurement device of Likins has its limitations which for years went unresolved. In this respect and with reference to FIG. 3 of Likins, the sensing device in Likins that is used to determine the depth of the pile and/or auger is joined to line 56 by a three-roller system. While not shown, this three-roller system is supported by the structure of rig 10, but which engages line 56 at or near the boom 12 of rig 10. The three roller system includes an encoder wheel 52. Further, in order to account for the movement of the wire as it is unwound from line real or drum 54, the roller system is joined to a fixed rod (not shown) having a linear bearing configured to allow lateral motion of the measurement system while the wire is unwound. As is known in the art, the wire being unwound from a roll or drum of wire can have significant lateral movement in that the wire is wound across the entire surface of the drum supporting the wire. While the linear bearing arrangement is effective in handling the lateral movement of the wire, it is not effective in handling the changes in load in the direction of line 56 wherein it has been found that the support rod, that is used to support the linear bearing, often deforms or fails in use. In either case, this condition adversely affects the accuracy of the depth sensor and the failure of the system in the field can cause downtime for the pile installation process. Thus, while Likins is an effective system to measuring pile depth, there is a need for a more accurate system for the end of drive portion of the pile driving operation to more accurately determine exactly when the set point is reached.

Yet another problem found with the depth measurement system disclosed in the prior art is that the data produced by the system can be corrupted if the line is allowed to go slack. In that the measurement system is joined to the line, the line itself becomes a variable that must be maintained as a constant. A slack condition in this line affects this constant and can produce error. Moreover, if this slack condition is not noticed, the error in the data may not be known, which would result in a less accurate data set for the pile installation period. Depending on the frequency of the slack condition, and the other factors discussed above, the resulting data could be corrupted enough to prevent its use in evaluating the structural integrity of the installed pile. Again, accuracy levels of this type of system are well suited for general depth measurements, but can be less than ideal for the end of drive measurement of the driving process. Yet even further, the wire measurement system tends to lose accuracy as depth increases in that the stretching of the wire increases. Therefore, a wire measurement system is at its least accurate point during the end of drive.

In addition to Likins, U.S. Pat. No. 6,533,502 to McVay is also incorporated by reference and forms part of this specification. The McVay patent also discloses a system for the determination of pile parameters and includes at least one structure for measuring pile data. The system discloses a structure for measuring pile data that is disposed within a measurement range from a pile wherein a wireless transmitter is communicably connected to the structure for measuring pile data. As with Likins, the wireless transmitter for transmitting the pile data can be in connection with a remotely located receiver.

Another patent incorporated by reference and forming part of this specification is U.S. Pat. No. 6,301,551 to Piscalko. The Piscalko patent discloses applicant's PILE DRIVING ANALYZER® system (PDA™) which obtains, processes and/or stores pile driving data. The PDA system is operable as an independent self-contained unit, or may be used in conjunction with a remote computer system. Position data indicative of the position of a pile, and pile data indicative of characteristics of a pile may be automatically input to the PDA system. When used in conjunction with the remote computer system, the PDA system may be controlled remotely by the remote computer system. Alternatively, the PDA system may be controlled locally by an operator, and data acquired by the PDA system provided to the remote computer system for monitoring and/or storage.

In that it is difficult to accurately measure the exact pile displacement per blow with many of the systems known in the art, these measurements are often calculated by hand. In some situations, by a person marking the blow on graph paper attached to the pile. This method includes an operator holding a pencil to the graph paper and the pencil mark then illustrates the displacement which includes the rebound of the pile after the blow. In that the human body is well adapted to correct for ground movement, this method can be effective for experienced operators. However, and as can be appreciated, this system can vary widely based on the expertise of the operators and is not always a repeatable measure of displacement. Further, while these methods appear simple, they are costly both in the manpower needed to make the measurement and the safety factors that are must be built into these kinds of measurement to ensure that the set point has been reached. Yet even further, it is difficult, costly and/or impossible to quickly digitize this type of data for remote monitoring and/or data storage.

Attempts have been made to address the accuracies relating to depth measurement and the needed accuracy during the end of drive of the pile, but these have been found to have their own set of problems. One such device utilizes lasers to measure pile displacement. However, laser systems have had problems in field since they can only be utilized during clear weather. As can be appreciated, lasers require clear conditions and can be affected by rain and fog. In addition, the laser must be directed in the driving direction of the pile being driven, namely, must be a vertically aimed laser directed toward a horizontal surface for vertically driven piles. In that the only naturally horizontal surface is the one which is being impacted by the pile driving hammer, a ledge of some sort must be added to the pile which results in the measurements being taken from a surface other than a pile surface. As can be appreciated, this adds yet another variable that can affect the accuracy of the system.

Thus, the industry is looking for low cost and accurate ways to determine pile capacity and reaching the set point for driven piles. Further, there is a need in the art for an accurate measurement for this end of drive portion of pile driving that can produce documentable and repeatable measurements that are accurate regardless of the experience of the pile installation crew.

SUMMARY OF THE INVENTION

In accordance with the present invention, provided is a measurement device for measuring displacement; and more particularly, provided is a measurement device for measuring pile displacement that includes the use of microwave phase measurement of the displacement of the pile.

More particularly, according to one aspect of the invention of this application, the measuring device includes phase tracking from signals sent from a transmitter and received by a pair of receivers thereby allowing phase changes to measure displacement.

According to another aspect of the invention, one transmitter is positioned relative to a structural pile and two spaced receivers are positioned away from the pile whereby the system can accurately detect phase changes to measure displacement.

Again, it has been found that this works particularly well for the end of drive portion of the driving process to find the set point. As a result, the invention of this application includes the use of this device by itself and also the use of this device with other devices known in the art and which will be known in the future. This can include the use of the invention of this application with low cost and/or simple techniques used to generally gauge the depth of the driven pile and which are supplemented with the invention of this application during the end of the drive.

According to another aspect of the invention of this application, two or more receiving antennas are positioned on a support spaced from the pile a set distance, such as ten (10) meters from the pile. In addition, at least one transmitting device is positioned on a face surface of the pile and/or a surface parallel to the face which sends a signal toward the two or more receiving antennas. As the pile is displaced the distances between the transmitter and the receiving antennas changes which can be used to calculate the displacement of the pile.

According to further aspects of the invention of this application additional transmitters can be used and/or additional receivers can be utilized to increase the measurable range of the system, increase accuracy and/or provide for the gathering of parallel data to check for data accuracy. In certain embodiments, these additional transmitters and/or receivers can operate on different frequencies wherein they can operate in parallel to one another without interference.

Yet other aspects of the invention can include a system that can transmit data either locally and/or to a remote location wherein the end of drive can be monitored by engineers or the like to determine when the set point is reached. Yet even further, this can include transmitting data locally and/or to a remote location so that a computer program and/or engineer can determine when the set point has been reached.

Further, these and other objects, aspects, features, developments and advantages of the invention of this application will become apparent to those skilled in the art upon a reading of the Detailed Description of Embodiments set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DETAILED DESCRIPTION OF EMBODIMENTS

Figure 1:
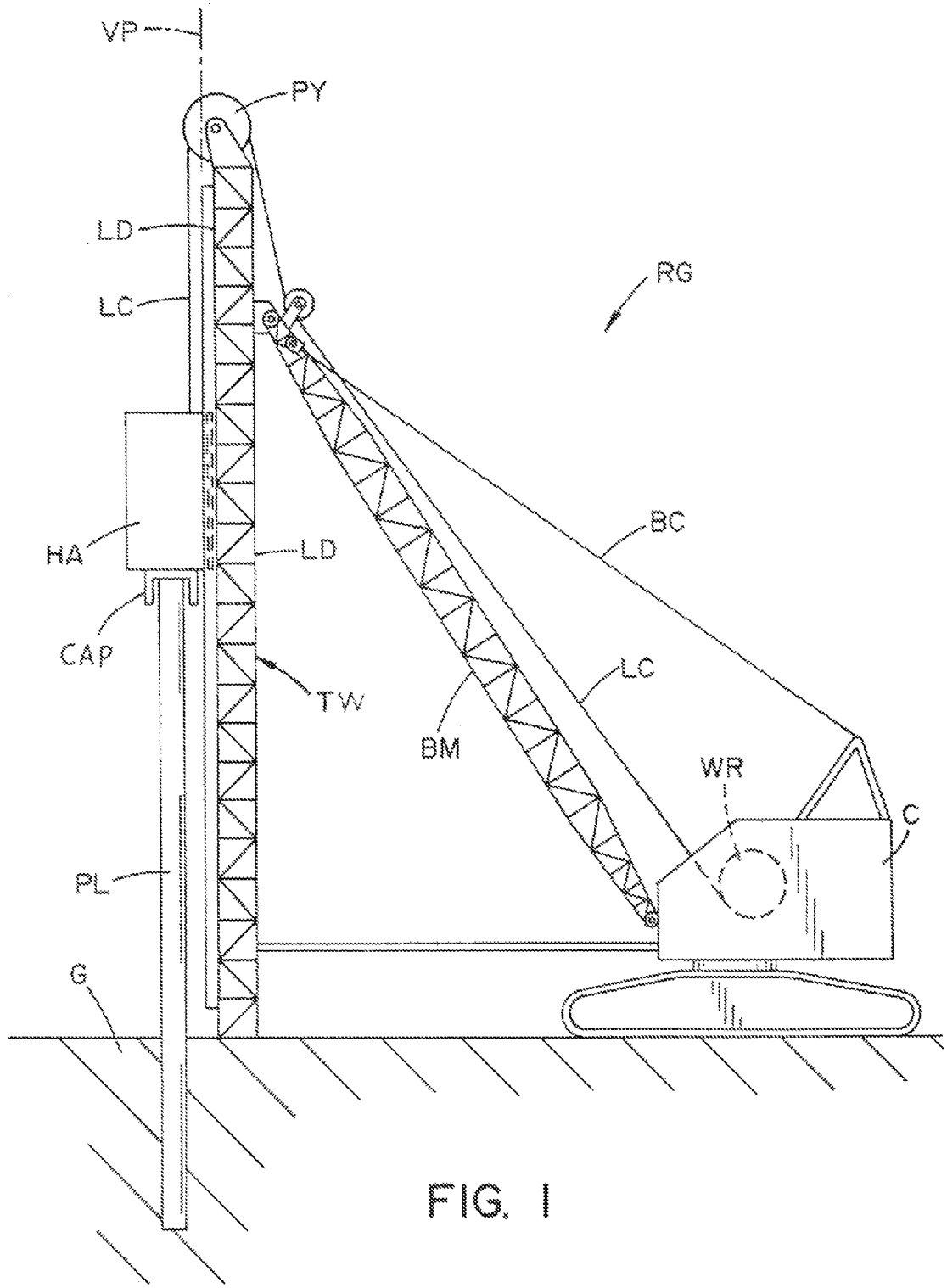
FIG. 1 is an elevational view of a pile installation machine and a hammer driven pile.

Referring now to the drawings wherein the showings are for the purpose of illustrating preferred and alternative embodiments of the invention only and not for the purpose of limiting same, FIGS. 1-3A show several views of a rig or pile installation machine RG including measuring devices according to several embodiment of this applications. However, while the invention of this application is being shown in connection with a hammer rig, the invention of this application can be used in connection with other machines including an auger cast pile installation machine.

Again, Rig RG is intended to be illustrative only and is not intended to limit the invention of this application to a particular rig, or a particular style or type of rig. Conversely, it is intended to be only illustrative of a rig in general. For the rig shown, rig RG is for driving piles and includes a hammer assembly or load box HA that moves relative to tower TW in a vertical plane to hammer a pile PL into a ground layer G. The system can further include a pile cap CAP to protect the pile from the blows of the hammer and reduce damage to the top of the pile. Pile rig RG generally comprises of a boom BM, leads LD, a load cable LC, a boom cable BC, one or more pulleys PY for a load cable LC, a wire reel WR, and a cab C. Boom BM extends outward from the rigs cab to support and align tower TW. Load cable LC extends from the wire real in cab, across pulley PY, and to hammer assembly HA. Cable LC supports the hammer assembly which is disclosed in greater detail in Likins which is incorporated by reference into this application and which is known in the art. In general, movement of cable LC results in vertical movement of the load box in a vertical plane VP and, as will be discussed more below, the invention of this application is configured to monitor the changes in depth of pile PL to ultimately determine the exact progress of pile PL as it is driven into ground layer G in the vertical plane (based on this example). In this respect, and as is known in the art wherein it will not be discussed in detail herein in the interest of brevity, each hammer impact includes an upward stroke wherein cable LC lifts load box HA vertically in the vertical plane and a downward stroke when the load box is released and the weight of the load box produces this downward stroke. If the downward stroke is larger than the upward stroke, the pile has been driven into the ground a distance equal to the difference between the downward and upward strokes. This difference can be monitored and could be used ultimately to determine the depth of the pile in ground layer G and/or whether the pile has reached a set point SET for maximum bearing capacity.

Figure 2:
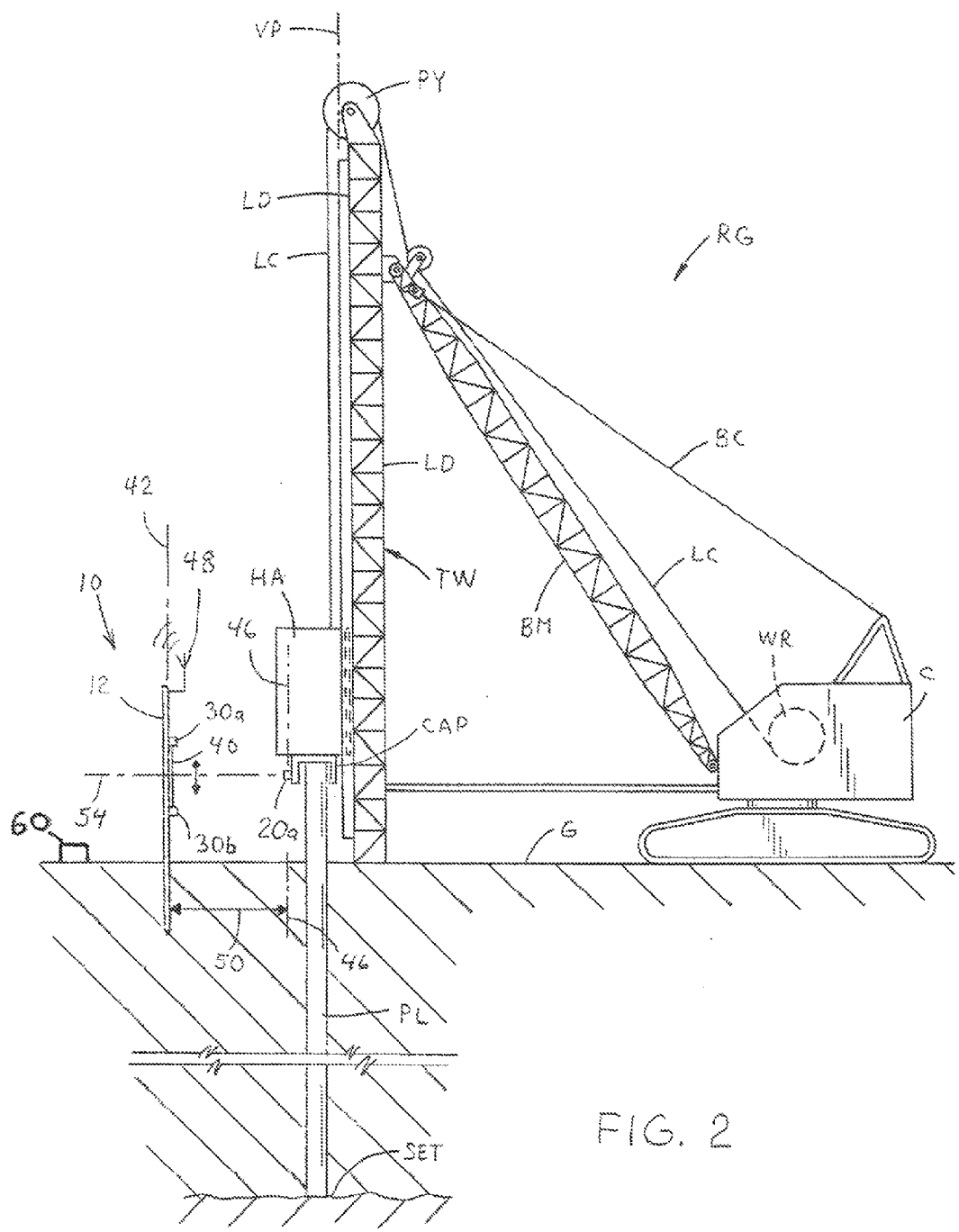
FIG. 2 is an elevational view of a pile installation machine and a hammer driven pile showing a preferred set of embodiments of this application.

With respect to the embodiment shown in FIG. 2, shown is system 10 that can be separate from the rig and the system include one or more transmitters 20 and one or more receivers 30. The transmitters and receivers are mounted such that one is secured relative to the pile and the movement of the pile and the other is positioned on one or more supports 12. Supports 12 can be any support structure including, but not limited to, a rod or pole forced into a ground layer G, a support stand placed on ground G, a modular support system including other devices used to monitor activities at a job site. The embodiment shown n FIG. 2 includes support 12 that is a pole-like structure that is forced into ground layer G and includes two receivers 30a and 30b, which will be discussed in greater detail below. In this embodiment, support 12 is configured to support two or more of receivers 30 even though only two are shown. Further, as will be discussed more below, support 12 could also be configured to support one or more transmitters 20. In one set of embodiments, support 12 includes an adjustment plate or device 40 adjustably connected to support 12 wherein receivers 30a and 30b are joined to device 40 and, therefore, can be adjusted along an antenna support axis 42. System 10, as is shown in FIG. 2, further includes a transmitter 20a that is joined relative to pile PL and can be joined to cap CAP. Transmitters 20a will move with pile PL along an antenna pile axis 46.

Axes 42 and 46 are configured to be parallel to one another and spaced from one another by a distance 50 wherein system 10 is further configured such that receivers 30a and 30b are generally equidistant from axis 46. However, as can be appreciated, while it is preferred that axes 42 and 46 are exactly parallel to one another, the reality is that it is difficult to achieve an exact parallel alignment wherein these axes are considered generally parallel to one another. Yet further, transmitter 20a also defines a center line 54 that is transverse to axes 42 and 46, which is again preferred to be transverse to axes 42 and 46, but which could vary some therefrom.

Figure 3:
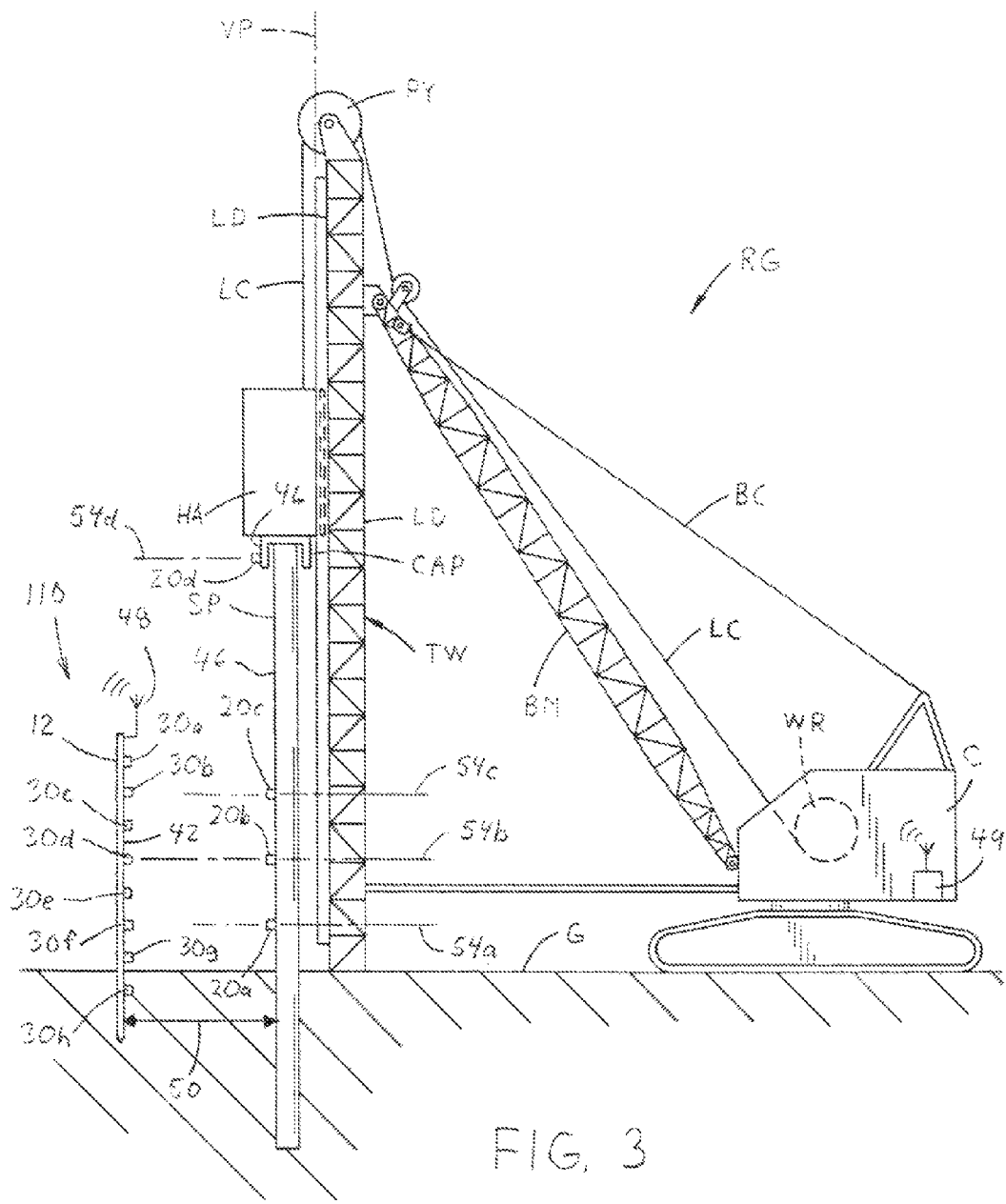
FIG. 3 is an elevational view of a pile installation machine and a hammer driven pile showing another set of embodiments of this application.
Figure 3A:
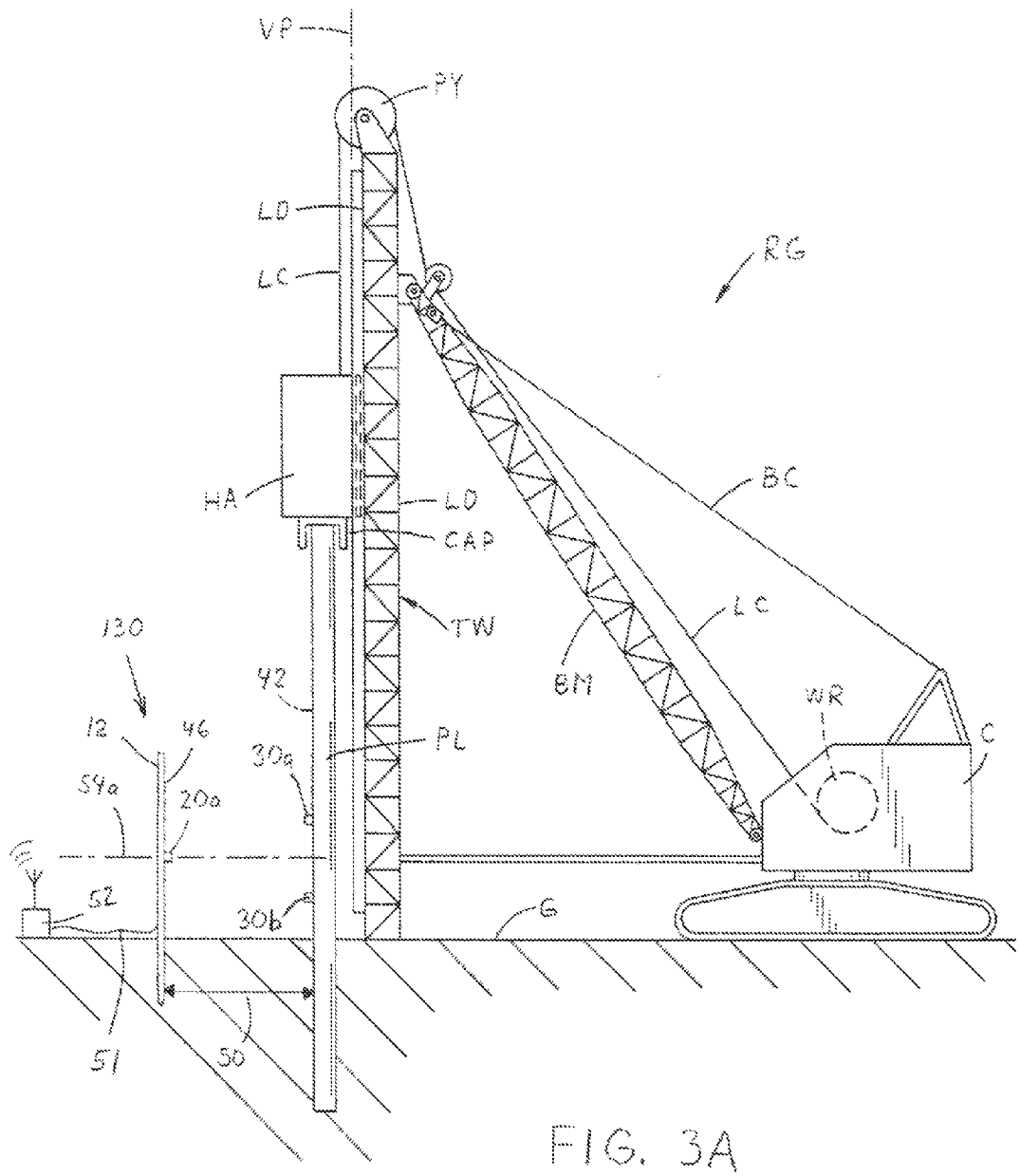
FIG. 3A is an elevational view of a pile installation machine and a hammer driven pile showing yet another alternative set of embodiments of this application.

The system further includes one or more computing and/or communication systems 60 to generate, analyze and/or transmit data generated by transmitters 20 and receivers 30. The communication system can include any systems known in the art including, but not limited to, wired systems, wireless systems, transceivers, cellular systems, cable systems, analog to digital converters, data stores, processors, input devices, display devices and/or even satellite systems. Further, as will be discussed below, the receiver of the generated data can also include a communication system as referenced above or a computer system. Further, the computer system can be any computing system known in the art including, but not limited to, a personal computer, a laptop computer, a hand held computer, a phone, a cell phone, a computer pad, a calculator and/or even an application on a cell phone. Further, these computer systems can be located anywhere wherein in certain embodiments they are located on site such as in the cab of the rig, in a local office, or even being held by someone on the jobsite. In yet other embodiments, part of the system can be offsite or can communicate with additional systems and/or personnel that are offsite. As is shown in FIG. 3 as an example only, system 10 can include a transceiver 48 in communication with receivers 30a and 30b that can send data (processed or unprocessed) to computing device 49 in cab C. Again, this can be done by any wireless or even wired technologies in the field. As is shown in FIG. 3A, system 10 can include a wired connection 51 such that receivers are in communication with computing device 52. However, while these computing systems are shown to be onsite, they could also be located offsite and/or a combination of onsite and offsite systems.

Figure 5:
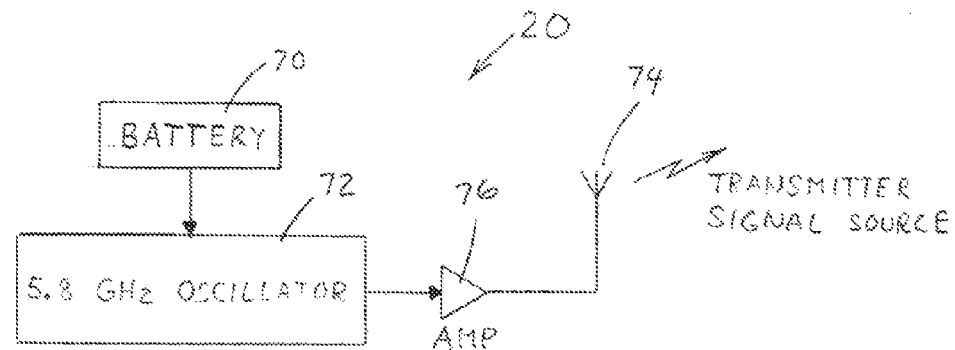
FIG. 5 is an electronic schematic of a transmitter portion of the invention of this application; and, FIG. 6 is an electronic schematic of a receiver portion of the invention of this application.
Figure 6:
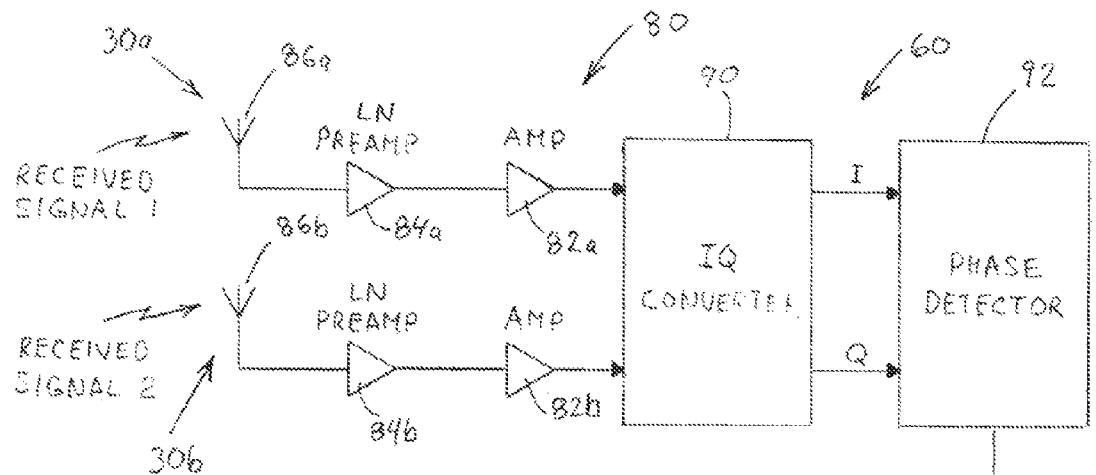

With reference to FIGS. 5 & 6, shown are the electronic schematics for transmitter 20a (FIG. 5) shown in FIG. 2 and a receivers 30a and 30b (FIG. 6) also shown in FIG. 2 including several aspects of the invention of this application. As referenced above, one or more transmitters 20 can be used in the embodiments of this application and two or more receivers 30 can be used in the embodiments of this application. These devices can be produced by a combination of electronics and can take many forms. As can be appreciated, these electronics can be encased in a number of types of housing designed to protect these systems from the harsh environments often associated with driving a pile. Further, these devices can include, or be used in combination with, a wide variety of other electronics and electrical devices such as replaceable power supplies, electronic outlets and plugs, charging systems, data stores, etc. Further, they do not need to be stand alone units and can include other systems, or be a part of other systems that can provide other data relating to the driving of a pile. Yet further, one or more of the components of the transmitters 20 and/or receivers 30 could be remotely linked to the respective antennas of the transmitters and/or receivers to protect these components from the harsh conditions associated with the hammering of a pile, which will be discussed more below. This can include, but is not limited to, an antenna fixed relative to the pile and joined by wire to the remaining components of the transmitters and/or receivers wherein the components are isolated from the pile; such as these components being mounted to the rig or to a separate support structure (not shown).

With specific reference to FIG. 5, shown is transmitter 20 that includes a power supply 70, an oscillator 72 and an antenna 74. An amplifier 76 can be positioned between oscillator 72 and antenna 74 to amplify the microwave signal produced by transmitter 20. Again, as discussed above, all systems except for antenna 74 could be remotely located to reduce the damage to these systems in view of the harsh conditions associated with driving a pile into the ground. This can include one or more of these systems spaced from the working axis 46 wherein in at least one embodiment, only antenna 74 is fixed relative to pile PL. Essentially, as is discussed in this application relating to positioning and alignment, the actual antenna of the device, not the device as a whole, defines the axes and the center lines. For transmitters 20, antenna 74 defines axis 46 and center line 54.

While a wide range of frequencies could be used in the invention of this application, it has been found that a 5.8 GHz oscillator 72 works well to create a cost effective apparatus and to produce the needed accuracy of the system. In this respect, 5.8 GHz systems are common along with the electronic devices used with these systems. Amplifier 76 can be a medium power amplifier to drive antenna 74. With respect to power supply 70, any power supply could be utilized including, but not limited, traditional batteries, rechargeable batteries and plug in systems. In that transmitter 20 can be battery powered, unit 20 can be a self contained unit that attaches directly to the pile, directly to a component fixed relative to the pile (such as cap CAP) of the pile to be measured, or in other embodiments connected to support 12. Again, at least antenna 74 is to be fixed relative to the pile so that antenna 74 moves as pile PL moves and defines axis 46 and center line 54.

With special reference to FIG. 6, receivers 30a and 30b can be stand alone units or part of a system 80. In greater detail, and as discussed above, receivers 30a and 30b could be stand alone units in wired or wireless connection with an operating system, such as operating system 60. As is shown in FIG. 6, system 80 includes receivers 30a and 30b along with other system components to generate the data to be analyzed and/or to determine the displacement of the structural object being displaced. These can include one or more amplifiers 82 and/or one or more pre-amplifiers 84. Receivers 30a and 30b further include antennas 86a and 86b, respectively, for receiving the signal emitted by transmitter 20. As with the transmitters discussed above, antennas 86a and 86b are positioned along axis 42 while other systems and components can be spaced therefrom. Once signal CW is received by antennas 86a and 86b, the data can be amplified first by low noise preamplifiers 84 and then the signal can be further boosted by amplifiers 82 and these amplifiers works in combination to boost the gain for processing by an I/Q converter 90. An I/Q signal keeps track of direction so there is no ambiguity as to the phase direction. The I/Q signal is then sent to a phase detector 92 and digitized by an analog to digital converter 94 so that a microprocessor 96 can keep track of the phase. Microprocessor can also be configured to calculate the displacement of pile PL after each hammer strike.

The microprocessor can also interface to a display 100 and/or human interface device 102. Yet further, the system can include a communication device 106 that can transmit data to a remove location. This can include the use of transceivers, cellular systems, cable systems, satellite systems and/or internet based systems along with other technologies.

Unlike prior art systems, the use of radio frequency signals (microwaves) prevent weather conditions from affecting the measurement of displacement wherein it has been found that the system is not affected by weather conditions.

With reference to FIGS. 3 and 3a, shown are examples of alternative embodiments. Essentially, system 10 can include one or more transmitters or microwave sources 20 secured relative to pile PL and/or secured to support 12. This can include transmitter(s) 20 and/or receivers 30 attached directly to the pile, attached to components fixed relative to the pile (such as pile cap CAP between hammer HA and pile PL, attached to tower TW and/or to separate structures such as support 12. As is shown in FIG. 2, the one or more microwave sources or transmitters 20 are attached relative to pile PL (on cap CAP) and as is shown in FIG. 3A, the one or more microwave sources 20 are attached to support 12. Yet further, these transmitters 20, receivers 30, antennas 74 and antennas 86 can be securable to these structures wherein any techniques known in the art could be used to attach these devices in the needed locations to operate system 10.

Further, while only a single source or transmitter 20 is needed, the invention of this application can include multiple sources and these multiple sources can utilize one or more frequencies. For single frequencies, these can be utilized to increase the range of the system without the need to move receivers and/or transmitters. Multiple frequencies could be used to allow multiple systems 10 to work simultaneously and to overlap with one another without interference. Similarly, while the system needs at least two receivers 30 that are again either joined to the support and/or the pile, the system can include more than two receivers. In the preferred embodiment, it has been found that it is preferable to mount receivers 30 to a support object, such as support 12 and to mount transmitters 20 relative to the pile. Again, it must be noted that while the application discusses mounting devices to the pile or relative to the pile, this does not mean a direct connection thereto or a permanent connection, and it is preferable to mount them to pile cap CAP especially when used for end of drive measurements. It merely means that the device is fixed relative to the pile. Further, there can be some movement relative to the pile if it is correctable and/or accountable. For example, in view of the harsh nature of a hammer blow from a pile driving hammer, the system can include a shock management system between the device and the pile to help prevent breakage of the device. This can minimize the damage to the system and can be effective if the relative movement is accountable or controllable such as the shock absorbing system returning the device to its original location relative to the pile after the shock wave has dissipated.

With reference to FIG. 3, shown is a system 110 that includes multiple transmitters 20a-d and several receivers 30a-h that can be utilized to monitor a wider range of movement of pile PL. Transmitters 20a-d define center lines 54a-d, respectively. As with the system shown in FIG. 2, this system includes the transmitter fixed relative to the pile while the receivers are fixed to a support object spaced from the pile. The transmitters can all utilize the same frequency or can utilize different frequencies to reduce interference between adjacent tracking systems. Essentially, this system works similar to that shown in the other figures and, therefore, will not be discussed in greater detail in the interest of brevity.

With reference to FIG. 3A, shown is a system 130 that includes a transmitter 20a and two receivers 30a and 30b. Transmitter 20a defines center line 54a. However, in this embodiment, the receivers are fixed (securable) relative to the pile and the transmitter is fixed (securable) to a support object spaced from the pile. Essentially, this system also works similar to that shown in the other figures and, therefore, will not be discussed in greater detail in the interest of brevity.

According to one embodiment of the invention of this application, the transmitters and/or receiver can be provided in a string format wherein a series of each device is in line attached to a common electrical connection. Each of the devices on the string can have a unique location code wherein the particular transmitter and/or receiver can be selectively activated as desired. The general concept of using strings for measurement is shown in Piscsalko Publication No. US-2011-0200068 which is incorporated by reference herein and forms part of this specification for showing the same.

Yet even further, these transmitter and receiver devices can include a wide range of additional electronics and/or devices without detracting from the invention of this application. This can include a control structure to control the activation of the system. This can let the system know when to take a reading to either conserver power and/or to increase accuracy by only measuring displacement as desired times. For example, an accelerometer can send a signal to the transmitter and/or receiver (preferably the receiver), that a blow has occurred. This information can then be used to turn the system on or let it know to take a measurement. Further, this signal or response can be delayed so that only the net movement is tracked. Again, for example, this could be an activation signal for the transmitter and/or receiver with a delay signal (such as a 200 millisecond delay) to only measure the net displacement of the pile. This additional system can control the measurement system and when it is to take reading. Further, the additional system can provide additional data that can be used in combination with the measurement system of this application or can be used separately from the measurement system. For example, the accelerometer can be used to count the blows and can be used to activate or signal a desired measurement activity.

Similarly, the control system can allow multiple transmitters and receivers to be used simultaneously to make multiple readings of the same blow which can be used for error correction, increase accuracy, check for defective system components or any other reason to improve the operation of the system.

In another embodiment, systems 10, 110 and/or 130 can be used with other known pile driving systems to make yet other calculations. For example, the systems of this application can be used in combination with systems to measure hammer load wherein hammer load and displacement can be used to calculate the capacity of the driven pile. In this example, strain gauges and an accelerometer can be positioned on the pile to measure hammer energy. This data can be compared to the displacement of the pile from the hammer blow to estimate pile capacity. Thus, the device of this application plus hammer energy can be used to calculate driven pile capacity and this calculation can be done automatically by the system or by an engineer.

With reference to the functions of system 10, 110 and 130, while the system can have more than one transmitter and more than two receivers, the system utilizes one transmitter 20 and two receivers 30 to triangulate the displacement of pile PL based on phase changes. While the exact operation and triangulation of the system will be discussed in greater detail below, it has been found that there is a limit on the displacement that can be monitored with a single set of transmitters and receivers such that some embodiments include more than one set. In this respect, it has been found that receiving antennas spaced from a center line 54 by one (1) meter wherein the two receivers are space two (2) meters from one another, can only track a limited range of movement; such as only track around 1 to 2 meters of movement. This is one of the reasons for the above mentioned embodiments including sets of systems and/or sets of transmitters and/or receivers to extend the range by. This can include switching to different transmitters and/or receivers when the prior set is out of range such as are shown in FIG. 3. This can also include the above mentioned string of transmitters and/or receivers that could be linked in series when the range has been passed for a particular transmitter and/or receiver. The control of these strings of devices could be controlled electronically or manually and could be based on the particular devices on the string having location designation software to allow the computer or operator to know the exact location of the device in the string.

With respect to the triangulation, and with reference to system 10 of FIG. 2 (use for example only), a single transmitter 20 and two receivers 30a and 30b essentially form the core of the system and function to triangulate the displacement of the pile. In this example, transmitter 20 is connected relative to the pile (on cap CAP) and receivers 30a and 30b are joined to support 12. According to this embodiment, transmitter 20a is a microwave source joined relative to pile PL on cap CAP; however, it could be joined to a side portion SP of the pile without detracting from the invention of this application. Receivers 30a and 30b are joined to support 12 along axis 42 and are spaced distance 50 from axis 46 of transmitter 20a. This positioning results in the antennas of receivers 30a and 30b being vertical to one another, in this example, along a vertical axis. As can be appreciated, while it is important that the antennas are along an axis parallel to the pile, they do not need to be plumb. Further, it is the antennas themselves, and not the entire transmitters or receivers that define the locations of these devices. With respect to spacing 50, it is preferably ten (10) meters (between the axes), but any known distance could be utilized without detracting from the invention of this application, such as between five (5) meters and twenty five (25) meters.

As mentioned above, receiving antennas 30a and 30b are spaced on either side of center line 54 one (1) meter wherein the two receivers have a receiver antenna spacing of two (2) meters from one another in a preferred embodiment. This creates the device arrangement best shown in FIGS. 2 & 4 wherein the below discussion is with reference to these figures. While the receiver antenna spacing is preferably two (2) meters, this spacing can be varied without detracting from the invention of this application, such as between one (1) meter and five (5) meters.

Figure 4:
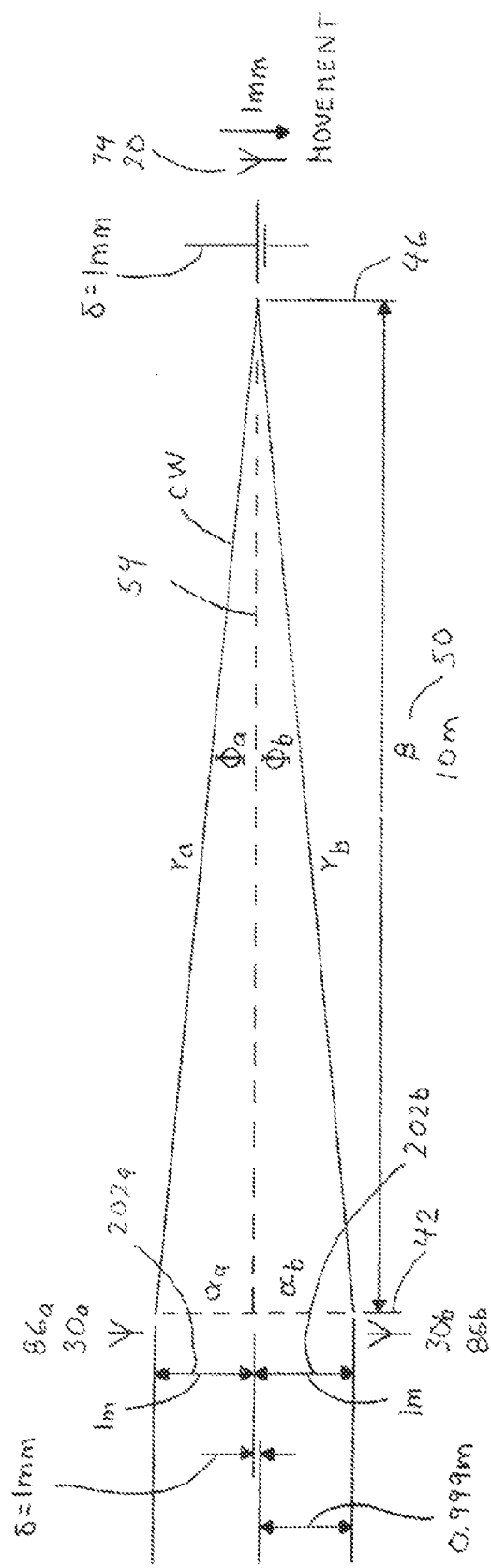
FIG. 4 is an enlarged schematic view of certain aspects of the invention of this application shown in relation to FIG. 2.

In this example, and with special reference to FIGS. 2 and 4, receivers 30a & 30b, that are spaced a distance 202a and 202b, respectively, on either side of center line 54 a distance of one (1) meter, such that receivers 30a & 30b are two (2) meters apart, receive a signal CW from transmitter 20 fixed relative to pile PL which is spaced a distance 50 that is ten (10) meters. In this example, angle 200 is:

$$\Phi_a = \arctan(\alpha_a/\beta)$$

Angle 200a=arctan(distance 202a/distance 50)

Angle 200=arctan(1/10)=5.71° and $$\phi_b = \arctan(\alpha_b/\beta)$$

Angle 200b=arctan(distance 202b/distance 50)

Angle 200b=arctan(1/10)=5.71°

The two antennas of receiver 30a and 30b therefore see the transmitter of Angle 200a plus Angle 200b which equals 11.42 degrees apart.

The received differential phase of the microwave signal between the receiving antennas is tracked. In this respect, considering just receiver 30b, before a pile hit:

$$\gamma_{b1} = \sqrt{(\alpha_{b1}^2 + \beta^2)} = 10.04988 \text{ m}$$

After transmitter 20 moves down by 1 mm, this changes to:

$$\gamma_{b2} = \sqrt{(\alpha_{b2}^2 + \beta^2)} = 10.04978 \text{ m}$$

The change in $\gamma_b$ "$\Delta\gamma$", $(\gamma_{b2} - \gamma_{b1}) = -0.1$ mm. Similarly, $\gamma_a$ increases by 0.1 mm. For the two antennas the relative change is $\Delta\gamma_a - \Delta\gamma_b = 0.2$ mm.

It has been found that a 5.8 GHz system can be used with the invention of this application. However, a wide range of frequencies can be used without detracting from the invention of this application. With a 5.8 GHz system:

Wavelength "$\lambda$"=c/f=c/5.8 GHz=51.7241 mm

With respect to frequencies, while higher frequencies could be used to increase the resolution of the system, it has been found that 5.8 GHz equipment is sufficiently accurate and is readily available in the electronics industry. Further, there are a lot of components available at this frequency at a fair price. Thus, while higher frequencies could be used to increase resolution, they can increase costs and this increase in cost is often not justified by the small gains in accuracy. However, it certain situations wherein accuracy is critical, the higher frequency systems could be utilized. In the future, this cost issues may not be the case with certain frequencies as they become more common.

The movement of 1 mm of the transmitter antenna thereby results in a change of the relative phase between the received antennas of:

Change in phase "$\Delta P$"=$2\Delta\gamma/\lambda$

=0.00387 Cycles

=1.3926 Degrees

Further, with respect to the range of the system per stroke or hammer strike, the received differential phase will make one cycle for every vertical displacement of 258.5 mm which is about 10 inches. Therefore, as long as the displacement is less than 10 inches between samplings (per stroke), the receiver electronics can track the change. According to at least one embodiment, the system further includes another method of measuring displacement to generally measure displacement to ensure that the maximum readable range per stroke has not been exceeded. This is a different situation than utilizing a string or multiple transmitting/receiving devices to increase the overall range of the system. Further, this can include the system having an internal measuring device that can also measure general displacement, such as, but not limited to, a wired measurement system, laser measuring, and an accelerometer.

Analog-to-digital converters (ADC) can be used to convert the data from the receivers into data that can be utilized to calculate the displacement of the pile. For the system of this application, it has been found that a 12-bit ADC can be utilized. For a true 12-bit ADC, the phase minus reference should yield 11-bit accuracy and result in an ultimate accuracy of:

$$P_{Accuracy} = 360/2K = 0.176 \text{ Degrees}$$

Movement Resolution=0.176 mm

The accuracy also depends on the settling time in the phase detectors, speed of reading, parallel alignment between the devices on support 12 and pile PL, etc. So, the real accuracy will be less than the resolution calculation discussed above. More bits or averaging will give more resolution.

As referenced above, the system of this application has been found to work well to measure the displacement of a pile being driven into a ground layer. Further, this information can be used to determine if the pile has been driven to the set point.

The invention of this application further includes methods relating to the use of the systems disclosed in this application.

The invention of this application further includes methods including the method of measuring the displacement of a structural object, such as a driven pile, including the steps of:

providing a radio frequency transmitter having a signal generator of a given frequency and a transmitter antenna and configured to emit a radio frequency signal;

providing a first radio frequency receiver having a first receiver antenna, the first receiver antennas being configured to detect the radio frequency signal emitted by the transmitter;

providing a second radio frequency receiver having a second receiver antenna, the second receiver antennas being configured to detect the radio frequency signal emitted by the transmitter;

providing a computing system that is in communication with the first and second receiver antennas and configured to receive a first signal from the first receiver and a second signal from the second receiver, the computing system further including a phase detector configured to detect the differences in phase between the first and second signals;

positioning the transmitter antenna relative to one of a structural object to be displaced and a support used as a fixed reference such that the transmitter antenna position defines a transmitter axis and a center line perpendicular to the transmitter axis;

positioning the first and second receiver antennas relative to the other of the associate structural object and the associated support along a receiver axis parallel to the transmitter axis;

spacing the first and second receiver antennas from one another along the receiver axis on either side of the center line by a receiver spacing;

spacing the receiver axis from the transmitter axis by an axis spacing;

emitting a radio frequency signal from the transmitter;

taking a first reading from the first and second receivers from the signal emitting in the emitting step;

displacing the structural object after the taking the first reading step;

taking a second reading from the first and second receivers from the signal emitting in the emitting step after the displacing step;

comparing the changes in phase from the first and second taking steps; and, calculating the displacement of the displacing step based on the changes in phase from the comparing step.

In yet other embodiments the method can include the system used in combination with other systems wherein the following steps are employed:

determining the general location of the bearing layer(s) or bedrock below the ground layer;

estimating the set point depth below the ground layer;

using a general measuring method to drive the pile to within 10 feet of the set point; and, using the system of this application to measure the pile displacement between the 10 foot point and the set point.

This method can further include the steps of:

communicating the information and/or when the set point is reached; and, using a combination of displacement and hammer blow energy to determine the set point.

As is known in the art, the pile displacement for each hammer strike varies as the pile is driven into the ground. The first hammer strike can cause significant pile displacement, but as the set point in approached, the hammer strike will produce less and less displacement. Thus, it is contemplated that the system of this application is best utilized during these final blows at or near the final drive portion of the driving process. However, systems such as those described in this application can have broader application and could be used outside of the final drive.

System 10, 110 and 130 can be used with other systems known in the art to determine the displacement by a single blow or even after multiple blows. This can include a display feature that graphs or just provides raw displacement numbers of the gross and/or net displacement of the pile based on the blows by the hammer. Thus, with the invention of this application, the monitoring of the pile displacement during this "end of drive" period can be automatic. It can even include a signaling device that can be used to indicate that a desired set of parameters have been achieved no matter what system or method is used to determine if the pile is set to a desired depth or a desired capacity has been achieved.

Again, while the invention of this application has primarily been described in relation to pile driving equipment, the invention of this application can be used with a wide range of pile installing equipment. Further, the system of this application can also be utilized to monitor the depth of other pile systems.

Further, while considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention.

It is claimed:

1. A system for measuring the displacement of a driven pile, in relation to a fixed reference, the system comprising:

a support structure transversely spaced from a displacement axis of an associated driven pile to be displaced;

a radio frequency transmitter including a signal generator of a given frequency and a transmitter antenna, the transmitter antenna securable relative to one of the associated driven pile to be displaced and the support structure used as a fixed reference for the measurement of the displacement of the associated driven pile along the displacement axis, when in the secured position the transmitter antenna being positioned on and thereby defining both a transmitter axis parallel to the displacement axis and a center line perpendicular to the displacement axis, the transmitter antenna being configured to emit a radio frequency signal of the given frequency;

the system further comprising a first radio frequency receiver having a first receiver antenna securable relative to the other of the associated driven pile and the support structure;

and a second radio frequency receiver having a second receiver antenna securable relative to the other of the associated driven pile and the support structure, when in the secured position, the first and second receiver antennas being positioned along a receiver axis parallel to the displacement axis and the first and second receiver antennas being spaced along the receiver axis on either side of the transmitter antenna and the first and second receiver antennas being spaced along the receiver axis on either side of the center line by a receiver spacing such that the first and second receiver antennas are generally equidistant to the transmitter axis, the receiver axis being transversely spaced from the transmitter axis by an axis spacing, the first and second receiver antennas being configured to detect the radio frequency signal emitted by the transmitter;

wherein the support structure is fixed relative to an associated ground layer and extends upwardly from the associated ground layer;

the transmitter antenna, first receiver antenna and/or second receiver antenna that is/are fixed relative to the associated driven pile to be displaced moving with the associated driven pile as it is displaced;

the system further including a computing system in communication with the first and second receiver antennas and configured to receive a first signal from the first receiver and a second signal from the second receiver, the computing system further including a phase detector configured to detect the differences in phase between the first and second signals; and, a computer processor to calculate the displacement of the associated driven pile based on the differences in the phase of the first and second signals.

2. The system of claim 1, wherein the transmitter antenna is a first transmitter antenna, the system further including a second transmitter antenna.

3. The system of claim 2, further including a third receiver antenna.

4. The system of claim 2, wherein the given frequency of the first transmitter antenna is unequal to the given frequency of the second transmitter antenna.

5. The system of claim 4, further including a third receiver antenna and a fourth receiver antenna, the third and fourth receiver antennas operating separately from the first and second receiver antennas.

6. The system of claim 1, wherein both the signal generator and the transmitter antenna of the radio frequency transmitter are fixed relative to the one of the associated driven pile to be displaced and the support structure.

7. The system of claim 1, wherein both the first and second receiver antennas and the phase detector are fixed relative to the other of the associated driven pile and the support structure.

8. The system of claim 1, wherein the radio frequency transmitter is fixed relative to the associated driven pile and the first and second receiver antennas are fixed relative to the support structure.

9. The system of claim 1, wherein the transmitter antenna is adjustable along the transmitter axis.

10. The system of claim 1, wherein the first and second receiver antennas are adjustable along the receiver axis.

11. The system of claim 1, wherein the first and second receiver antennas are fixed relative to one another but are adjustable as a pair along the receiver axis while maintaining the receiver spacing.

12. The system of claim 1, wherein the transmitter axis is spaced from the displacement axis.

13. The system of claim 1, wherein the signal generator includes an oscillator.

14. The system of claim 13, wherein the radio frequency signal is a microwave signal having the given frequency.

15. The system of claim 14, wherein the given frequency is about 5.8 GHz.

16. The system of claim 1, wherein the receiver spacing is greater than 1 meter.

17. The system of claim 16, wherein the receiver spacing is less than 5 meters.

18. The system of claim 1, wherein the axis spacing is greater than 5 meters.

19. The system of claim 18, wherein the axis spacing is less than 20 meters.

20. The system of claim 1, further including a shock management system between the associated driven pile and the transmitter or receiver.

21. The system of claim 1, further including an accelerometer and a switch operated by the accelerometer to signal the system that the displacement has occurred.

22. The system of claim 21, wherein the switch includes a delay function.

23. A method of measuring displacement of a driven pile, the method comprising the steps of:
provided a support structure;
providing a radio frequency transmitter having a signal generator of a given frequency and a transmitter antenna and configured to emit a radio frequency signal;
providing a first radio frequency receiver having a first receiver antenna, the first receiver antennas being configured to detect the radio frequency signal emitted by the transmitter;
providing a second radio frequency receiver having a second receiver antenna, the second receiver antennas being configured to detect the radio frequency signal emitted by the transmitter;
providing a computing system that is in communication with the first and second receiver antennas and configured to receive a first signal from the first receiver and a second signal from the second receiver, the computing system further including a phase detector configured to detect the differences in phase between the first and second signals;
positioning the support structure such that it is transversely spaced from the driven pile to be displaced;
defining a center line and a transmitter axis based on the position of the transmitter antenna, the center line being perpendicular to the transmitter axis;
positioning the first and second receiver antennas relative to the driven pile to be displaced and the support structure along a receiver axis parallel to the transmitter axis;
wherein the support structure is fixed relative to an associated ground layer and extends upwardly from the associated ground layer;
spacing the first and second receiver antennas from one another along the receiver axis on either side of the center line and thus the transmitter antenna by a receiver spacing;
spacing the receiver axis from the transmitter axis by an axis spacing;
emitting a radio frequency signal from the transmitter;
taking a first reading from the first and second receivers from the signal emitting in the emitting step;
displacing the driven pile after the taking the first reading step;
taking a second reading from the first and second receivers from the signal emitting in the emitting step after the displacing step;
comparing the changes in phase from the first and second taking steps; and,
calculating the displacement of the displacing step based on the changes in phase from the comparing step.

24. The method of claim 23, further including the steps of:
determining the general location of the bearing layer(s) or bedrock below the ground layer;
estimating the set point depth below the ground layer;
using a general measuring method to drive the pile to within 10 feet of the set point; and,
using the calculated displacement system to measure the pile displacement between the 10 foot point and the set point.

25. The method of claim 23, further including the step of using a combination of displacement and hammer blow energy to determine the set point.

* * * * *